US011810132B1

(12) United States Patent
Mohammedkhalil et al.

(10) Patent No.: US 11,810,132 B1
(45) Date of Patent: *Nov. 7, 2023

(54) METHOD OF COLLATING, ABSTRACTING, AND DELIVERING WORLDWIDE VIEWPOINTS

(71) Applicant: WORLD ANSWER ZONE LLC, Dover, DE (US)

(72) Inventors: Abdulrhman Khald Mohammedkhalil, Jeddah (SA); Talead Saaty, Jeddah (SA)

(73) Assignee: WORLD ANSWER ZONE LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,395

(22) Filed: Mar. 11, 2023

Related U.S. Application Data

(63) Continuation-in-part of application No. 17/848,355, filed on Jun. 23, 2022, now Pat. No. 11,605,139.

(51) Int. Cl.
| G06F 16/335 | (2019.01) |
| G06Q 30/0201 | (2023.01) |
| G06F 16/9535 | (2019.01) |
| G06F 40/117 | (2020.01) |
| G06F 40/279 | (2020.01) |
| G06T 7/20 | (2017.01) |
| G10L 15/22 | (2006.01) |
| G10L 25/57 | (2013.01) |
| G10L 15/25 | (2013.01) |
| G10L 15/08 | (2006.01) |
| G06F 40/58 | (2020.01) |

(Continued)

(52) U.S. Cl.
CPC ..... *G06Q 30/0201* (2013.01); *G06F 16/9535* (2019.01); *G06F 40/117* (2020.01); *G06F 40/166* (2020.01); *G06F 40/279* (2020.01); *G06F 40/58* (2020.01); *G06Q 50/01* (2013.01); *G06T 7/20* (2013.01); *G10L 15/08* (2013.01); *G10L 15/22* (2013.01); *G10L 15/25* (2013.01); *G10L 25/57* (2013.01); *G06T 2207/10016* (2013.01); *G06T 2207/30201* (2013.01); *G10L 2015/088* (2013.01)

(58) Field of Classification Search
None
See application file for complete search history.

(56) References Cited

U.S. PATENT DOCUMENTS 7,941,550 B1  5/2011  Smith et al.
8,043,224 B2  10/2011  Sarel
(Continued)

*Primary Examiner* — Jakieda R Jackson
(74) *Attorney, Agent, or Firm* — Christopher Pilling

(57) ABSTRACT

The present invention provides a system and method for presenting global issues to users and followers of a social media platform, allowing the users and followers to provide viewpoints on the global issues, ensuring that the users providing the viewpoints are authentic, and analyzing the various viewpoints to develop statistical data including the location of those providing viewpoints. The present invention also allows a user to present a global issue for consideration by users of the platform, for example, a social media internet-based website, and allows followers of the user to provide their viewpoints on such global issue. Simultaneously, the location of said followers will be collected and collated along with their responses.

20 Claims, 17 Drawing Sheets

(51) Int. Cl.
  *G06F 40/166* (2020.01)
  *G06Q 50/00* (2012.01)

(56) References Cited

U.S. PATENT DOCUMENTS

| | | | |
|---|---|---|---|
| 9,576,045 B2 | 2/2017 | Ross et al. | |
| 10,477,271 B1* | 11/2019 | Higbee | H04N 21/2668 |
| 11,532,256 B2 | 12/2022 | Ward | |
| 2008/0215607 A1* | 9/2008 | Kaushansky | G06Q 30/02 |
| | | | 707/999.102 |
| 2009/0222551 A1* | 9/2009 | Neely | G06Q 30/02 |
| | | | 709/224 |
| 2013/0083976 A1* | 4/2013 | Ragland | A61B 3/113 |
| | | | 382/117 |
| 2014/0088961 A1* | 3/2014 | Woodward | G10L 15/22 |
| | | | 704/235 |
| 2014/0150016 A1* | 5/2014 | Feng | G06Q 30/0255 |
| | | | 725/34 |
| 2014/0222512 A1* | 8/2014 | Pace | G06F 3/0484 |
| | | | 705/7.32 |
| 2015/0236925 A1 | 2/2015 | Bodz et al. | |
| 2015/0120845 A1* | 4/2015 | McClard | H04L 51/224 |
| | | | 709/206 |
| 2015/0161632 A1* | 6/2015 | Humay | G06Q 30/0203 |
| | | | 705/7.32 |
| 2015/0350733 A1* | 12/2015 | Persidis | H04N 21/4781 |
| | | | 725/24 |
| 2015/0379989 A1* | 12/2015 | Balasubramanian | G06Q 30/0257 |
| | | | 704/233 |
| 2015/0382079 A1* | 12/2015 | Lister | G11B 27/28 |
| | | | 725/38 |
| 2016/0012739 A1* | 1/2016 | Jafari | G09B 5/06 |
| | | | 709/204 |
| 2016/0048932 A1* | 2/2016 | McNelley | G06Q 30/016 |
| | | | 705/14.66 |
| 2016/0073148 A1* | 3/2016 | Winograd | H04N 21/6582 |
| | | | 725/18 |
| 2016/0343087 A1* | 11/2016 | Dange | G06Q 50/26 |
| 2017/0140423 A1* | 5/2017 | Atalla | H04L 51/52 |
| 2017/0300976 A1* | 10/2017 | Dogruöz | G06Q 50/01 |
| 2017/0351653 A1* | 12/2017 | Ramlet | G06Q 30/0245 |
| 2018/0145840 A1* | 5/2018 | Advani | H04L 12/1831 |
| 2018/0349485 A1* | 12/2018 | Carlisle | G06F 16/9535 |
| 2019/0066230 A1* | 2/2019 | Dange | G06Q 30/0205 |
| 2020/0013076 A1* | 1/2020 | Rinzler | G06Q 30/0203 |
| 2020/0098001 A1* | 3/2020 | Antala | G06Q 30/0277 |
| 2021/0042796 A1* | 2/2021 | Khoury | G06Q 50/01 |
| 2021/0056968 A1* | 2/2021 | Shreeshreemal | G10L 15/30 |
| 2021/0358324 A1* | 11/2021 | Lahiri | G09B 5/00 |
| 2021/0399911 A1* | 12/2021 | Jorasch | H04L 12/1822 |
| 2022/0292877 A1* | 9/2022 | Sepas-Moghaddam | G06V 40/165 |

* cited by examiner

METHOD OF COLLATING, ABSTRACTING, AND DELIVERING WORLDWIDE VIEWPOINTS

CROSS-REFERENCE TO RELATED APPLICATIONS

This application is a continuation in part application to U.S. Nonprovisonal patent application Ser. No. 17/848,355 entitled "METHOD OF COLLATING, ABSTRACTING, AND DELIVERING WORLDWIDE VIEWPOINTS" filed Jun. 23, 2022, issued Mar. 14, 2023 as U.S. Pat. No. 11,605,139 which is incorporated herein its entirety at least by reference.

BACKGROUND

As information relating to global political, social, and conflict issues continues to be more readily available to more people throughout the world, more people develop points of view about these matters. It can be useful for newspapers, political parties, business organizations, and other interested people to get statistical data from various people around the world on global matters.

Presently, social media systems are generally designed to be accessible internet based systems. Social media systems can take the form of blogs, microblogs, social networks, and the like. Various issues are presented and discussed over social media systems, however the issues may be answered anonymously, or by avatar-like identifiers. Further, it is not possible to determine the characteristics of people who are answering the issues. One particular characteristic that would be desirable would be knowing the location of people answering the issue and ensuring that they are authentic.

A system and method that has the capability to collect viewpoints from authentic users relating to a global issue, and being able to also log data on the location of those who are providing the viewpoints is needed and desirable.

BRIEF SUMMARY OF THE INVENTION

It is an object of the present invention to provide a system and method for presenting global issues to users and followers of a social media platform, allowing the users and followers to provide viewpoints on the global issue, ensuring that the users and follower who answer or provide viewpoints are authentic, and analyzing the various viewpoints to develop statistical data including the location of those providing viewpoints.

It is a further object of the present invention to allow a user to present a global issue for consideration by users of the platform, for example a social media internet-based website, and allow followers of the user to provide their viewpoints on such global issues. Simultaneously, the location of said followers will be collected and collated along with their responses.

It is a further object of the invention to track the interests of each user through their searches and interactions with posts and surveys containing text, audio, images and video. This information is stored as cookies within the back-end of the platform which contain the keywords of interest for an individual user from their interaction with the platform. These cookies can then be used as relevant data for other users searching the platform to find users with a particular interest and to target posts and surveys towards users with a particular interest.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

The following description is intended only by way of example, and simply illustrates certain example embodiments.

As used herein, the term "prominent figure" refers to an individual, who either publicly or privately, has exercised or exhibited character traits that imbibe admirable characteristics, or who is memorable to someone personal.

As used herein, the term "interview" refers to presenting someone with a question, whereupon the person/interviewee answer the question, usually from their point of view. In reference to the present invention, the presentation of a question to an interviewee is performed by a virtual interviewer, such as questions presented on a computer.

Figure 1:
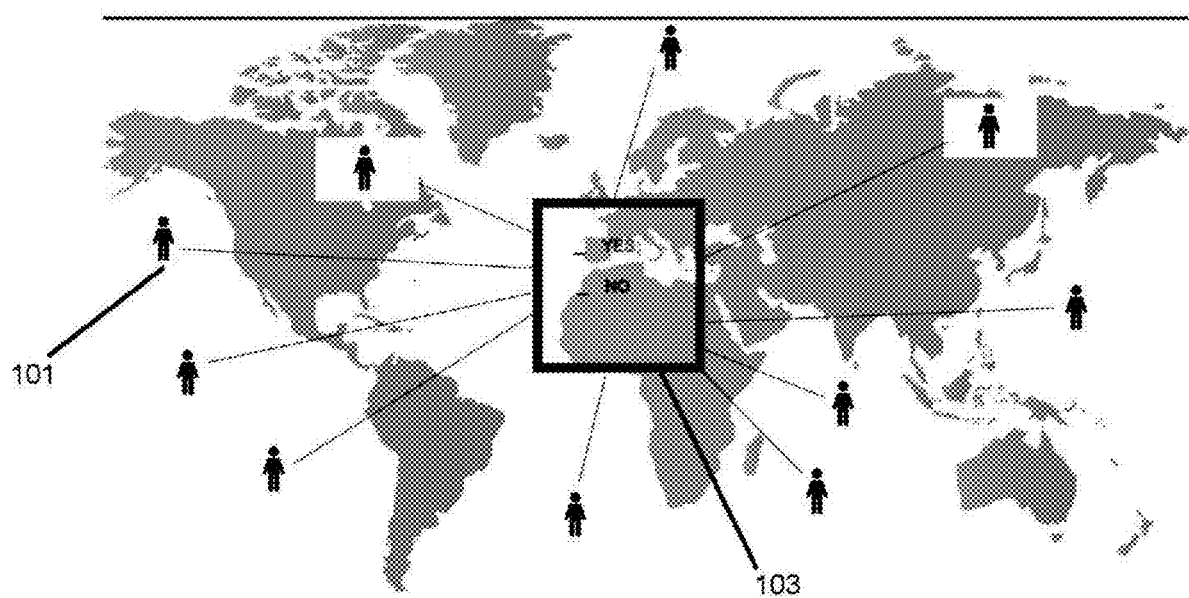
FIG. 1 of the present invention exhibits the global issue being accessible by multi-users.

With reference to the figures, FIG. 1 provides an overall embodiment of the present invention, whereby worldwide viewpoints of a particular issues can be collected, collated, summarized, and distributed to multiples of users whom may be interested in the particular issues. As shown in FIG. 1, the general elements involved in gathering worldwide viewpoints include the creation and distribution of a subject matter 103, to at least one user 101, whereby the user 101 can be located anywhere in the world.

The subject matter 103 preferably relates to an issue that is global in scope. Global in scope refers to an issue that may be related to or involve at least two different legal regimes. "Legal regimes" refers to a region of the world which has at least a legal government in power. Examples of legal regimes are countries, or administrative regions.

The subject matter 103 can be presented in a variety of different forms such as a questionnaire, survey, video, audio file, image and the like. The subject matter may be a live capture of audio, image or video from a user's device. A live capture is an audio, image or video that is recorded in real-time within the platform, utilizing the camera and microphone of the user's device, and immediately posted to the platform. In one embodiment, the subject matter 103 presents an issue global in scope, then asks user 101 to provide their viewpoint by selecting one of several choices. In a preferred embodiment, users 101 select from 1 of 2 choices. However, the choices can be from 1 to 10 choices, or less.

Figure 11:
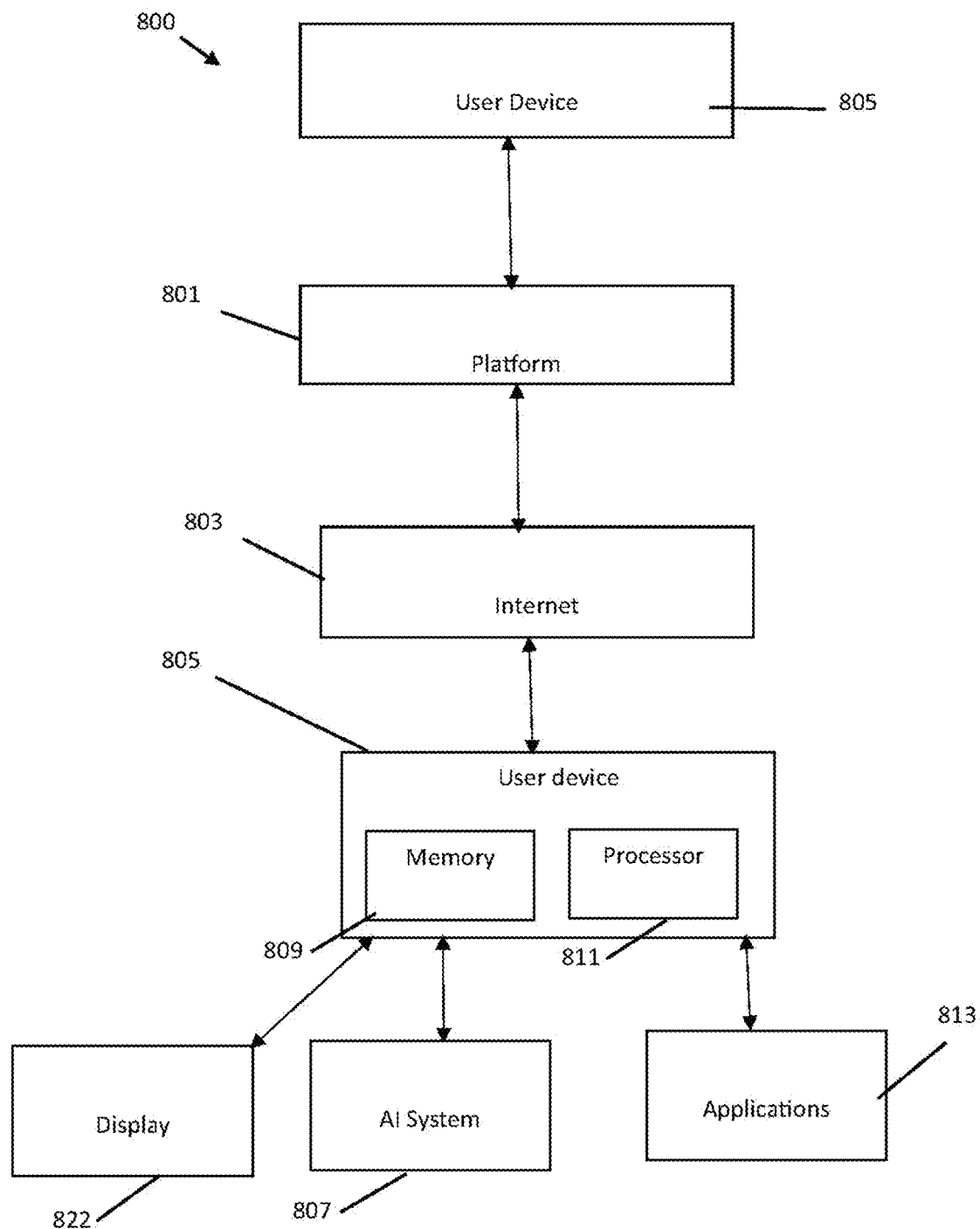
FIG. 11 is a block diagram of a system of the present invention using the AI system.

Users 101 can be number from 1 to up to the population of the planet Earth. Users 101 are persons who have access to the subject matter 103 and desire to provide a viewpoint. Users may be located anywhere in the world. Users may gain access to the subject matter 103 through an internet-based platform when the subject matter was initially posted (direct access) or through a third-party internet-based platform (indirect access). Users can utilize a variety of devices 805 (FIG. 11) to give direct or indirect access, including portable devices such as laptops, mobile phones, tabletop devices such as computers and the like. The user devices may include memory 809, processor 811 and applications 813 as illustrated in FIG. 11.

The interests of each user of the platform are tracked and stored as user-specific cookies within the back-end of the platform using the keyword tagging system whenever the user interacts with the platform. When a user executes a search on the platform, the keywords from the search are stored within the user's cookies. When a user creates a post or survey, or interacts with a post or survey on the platform, the keywords tagged to that post or survey are stored within the user's cookies. The posts or surveys may include text, images, video and audio, and in all cases the system will store the associated keywords within the user's cookies.

This process of storing keywords in a user cookie file, may include removing vowels from the keywords in order to reduce the amount of data stored without losing information.

As will be discussed later, user responses to the subject matter 103 will be collected, collated, analyzed, and distributed throughout the system and method.

Figure 2:
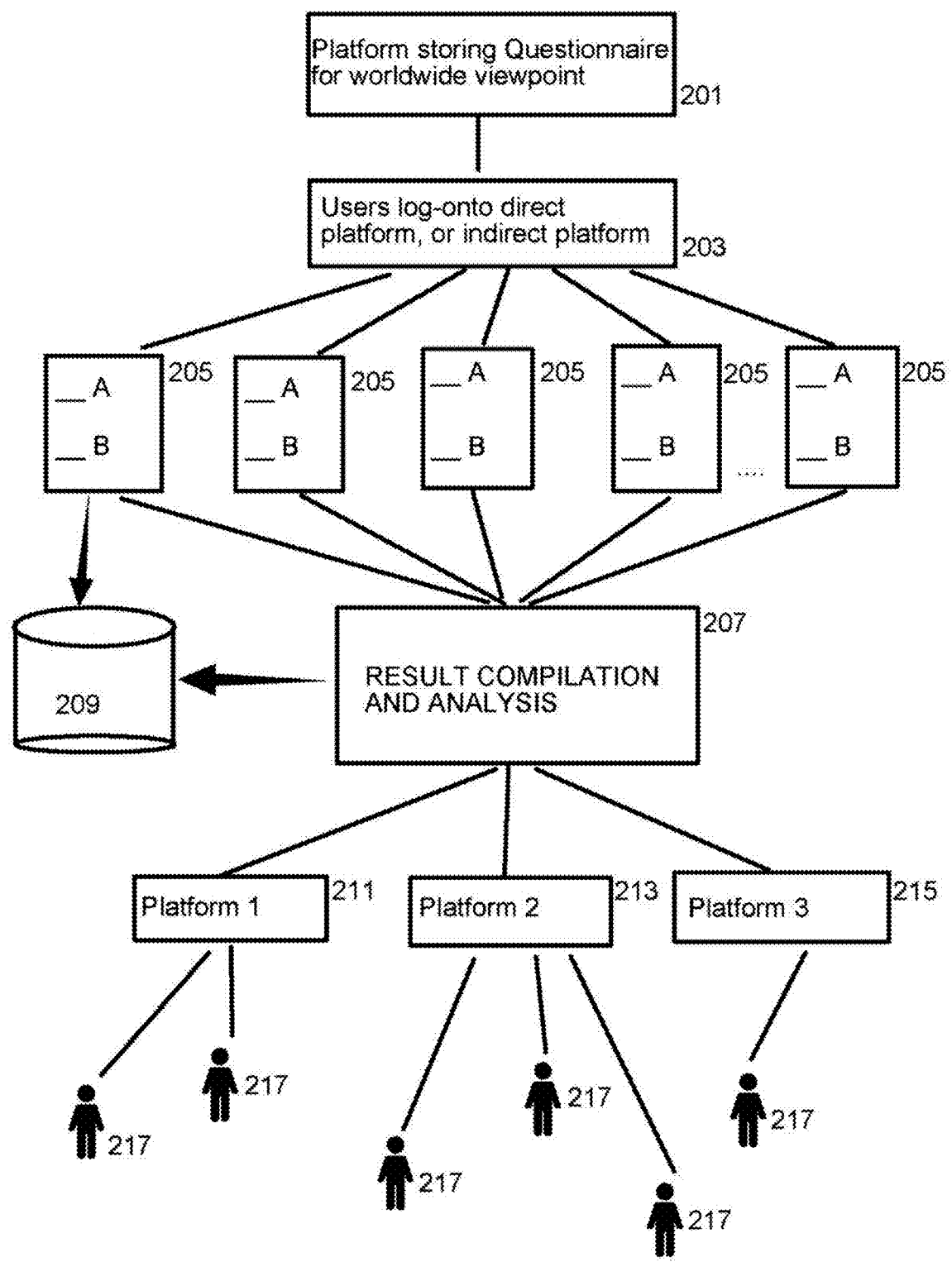
FIG. 2 of the present invention provides a method of operation.

FIG. 2 is an embodiment of the method of the present invention, including presenting a subject matter and accepting responses from users.

The subject matter, presented in a variety of different forms, may be tagged by the creator with one or more keywords to identify the subject of the post. In addition, the AI system may analyze the language in the written text, audio or video in order to create keywords for the post automatically. This process may also include translating the language to multiple preferred languages for creating keywords to tag to the post.

In cases where subject matter is posted on the platform and no keywords have been tagged to it by the creator and no language can be extracted from it, such as with some images and videos, other methods may be used to automatically tag keywords to the post. If the audio, image or video is a live capture from the user's device, then the location will be detected by the platform and tagged to the subject matter. In the case of images, the AI system will automatically detect if the image is similar to other images on file from the server and if so, may apply the keywords tagged to those images as tags for the new image. Lastly, the AI system will take the cookies associated with the creator of the subject matter and compare them with the cookies associated with other users that view the subject matter, look for similarities between the cookies of these users and use them to tag keywords to the subject matter.

The tagging of keywords by a user to subject matter on the platform uses an innovative system that allows spaces to be included within tags so that multiple words and phrases may be implemented as a single, easily-readable keyword tag. This is accomplished in the system by allowing the user to place matching special characters, such as @ or # at the beginning and end of the tag, such as @statue of liberty@. This then enables users to use search terms with spaces in order to find desired subject matter more easily.

As shown, subject matter requesting a worldwide viewpoint is set forth on a platform 201. Examples of such a platform include a website, or a digital social media platform. The platforms are present within the Internet. Users gain access to the subject matter 203 either directly, such as signing onto the platform upon which the subject matter was entered, or indirectly such as accessing a digital social media platform unto which the subject matter was "pushed" to.

To allow multiple users to access the subject matter, multiple instances of the subject matter are provided 205. Multiple instances will allow multiple responses to the subject matter, as well as provide data on the characteristics of the users who answer the subject matter.

Answer to the multiple instances of the subject matter are then complied and analyzed 207. Result compilation includes tallying the various responses in one answer or another. Additionally, details on the user data will be collated, including country of the users, age of the users, and the gender of the users. Users will either supply this information, or this information will be auto-collected, during answering the subject matter.

The results compilation and analysis as well as the subject will be stored in a storage 209. Simultaneously, the results compilation and analysis will be "pushed" to one of several platforms (211/213/215), including the platform upon which the subject matter was originally listed on, or on third-party platforms, such as social media platforms like Facebook, Instagram, LinkedIn, YouTube, WhatsApp, Google+, Facebook Messenger, WeChat, QQ, QZone, Tik Tok, Sina Weibo, Twitter, Reddit, Baidu Tieba, Skype, Viber, Snapchat, Line, Pinterest, Telegram, Tinder, Quora, Tumblr, Kakao talk, Kakao story, CYWORLD, MIXI, AMEBLO, MXit, BlackBerry Messenger, Vkontakte, XING, Viadeo, Odnoklassniki, and the like.

Various users will then be able to access the results 217 so they can then review a worldwide viewpoint relating to the issue.

Figure 3:
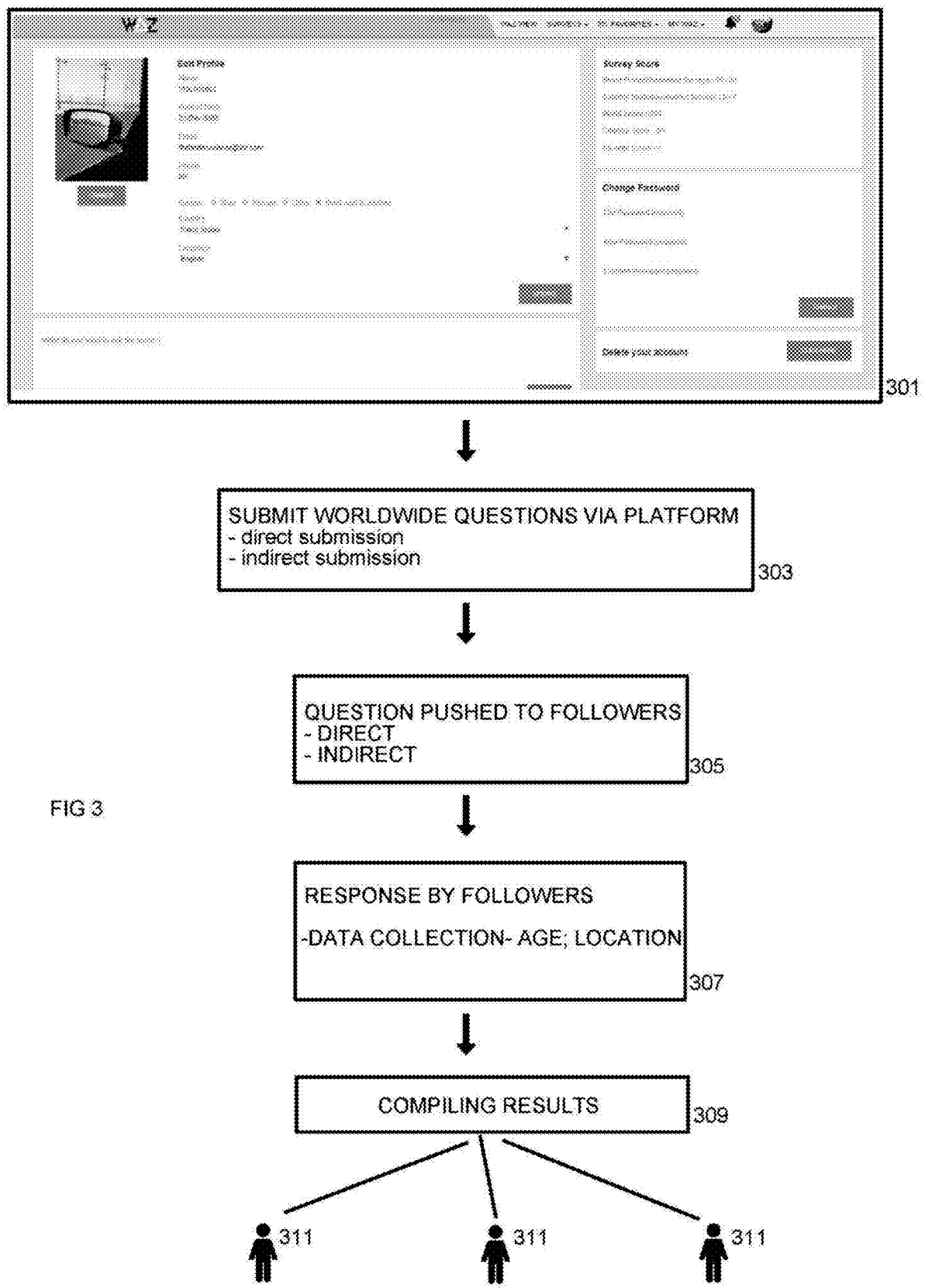
FIG. 3 of the present invention exhibits the platform for use in the method of the present invention.

FIG. 3 is an embodiment of the present invention, wherein a means for entering a subject matter on a platform is shown. At 301, a user may enter a subject matter using a platform, such subject matter will be delivered to users or followers of the subject-matter entering users. In entering a subject matter 302, the users may also enter profile data 304, such as which country the user is located in, the age of the user, preferred language of the user, user image, etc. The user may enter the subject matter and data in any language the user prefers. In a preferred embodiment, the method of the instant invention has auto-translation capability, which will allow users originally entered subject matter to be translated into different languages.

In an embodiment, the user enters in the subject matter directly unto the platform. In another embodiment, the user may enter in the subject matter using an unrelated third-party platform, for example a social media platform. The subject matter will be transmitted through the social media platform through to the direct platform 304.

The subject matter will then be "pushed" through to the users, or followers, of the subject-matter entering user. "Pushed" through to the users involves delivering to the user directly, through the platform 301, or indirectly, through third-party platforms, such as social media platforms.

Users, or followers, then provide responses to the subject matter 307. In addition, the followers can provide additional information such as location, age, etc. In one embodiment, data such as location is determined by global positioning satellite tracking incorporated within the platform of the present invention.

Figure 6:
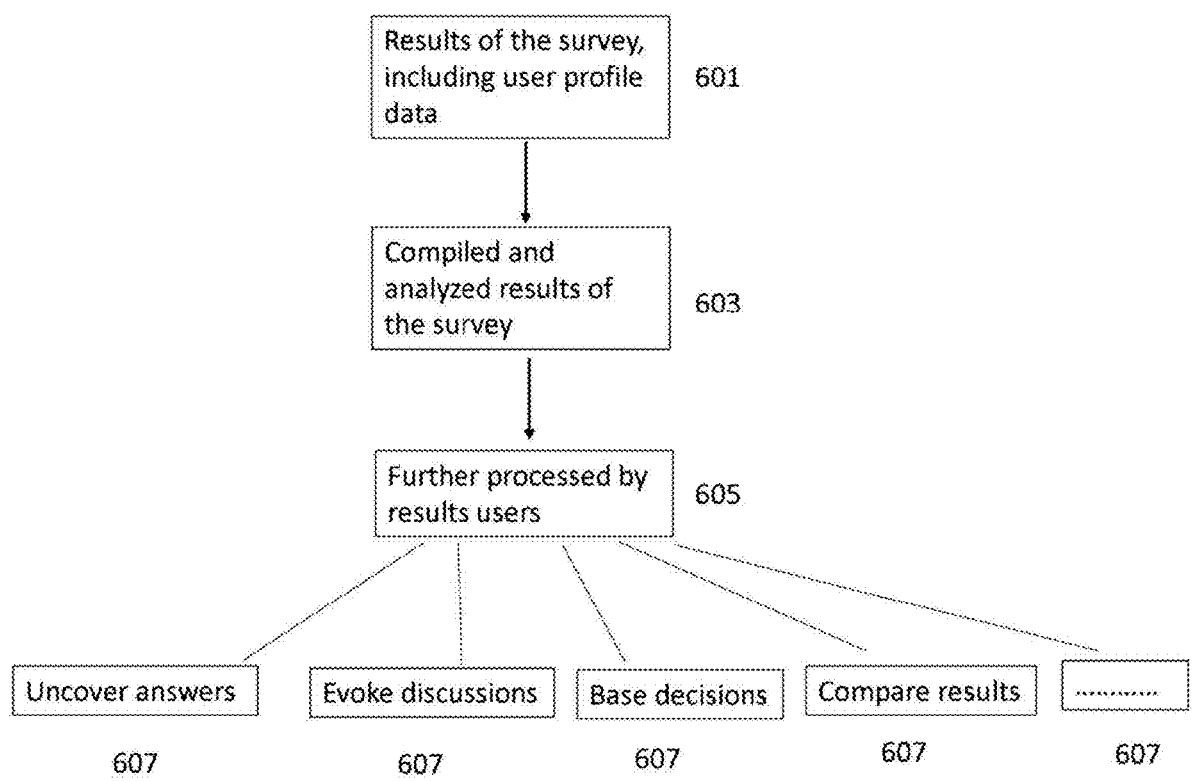
FIG. 6 shows a block diagram of the processing the results of the survey of the answers to the subject matter.
Figure 7:
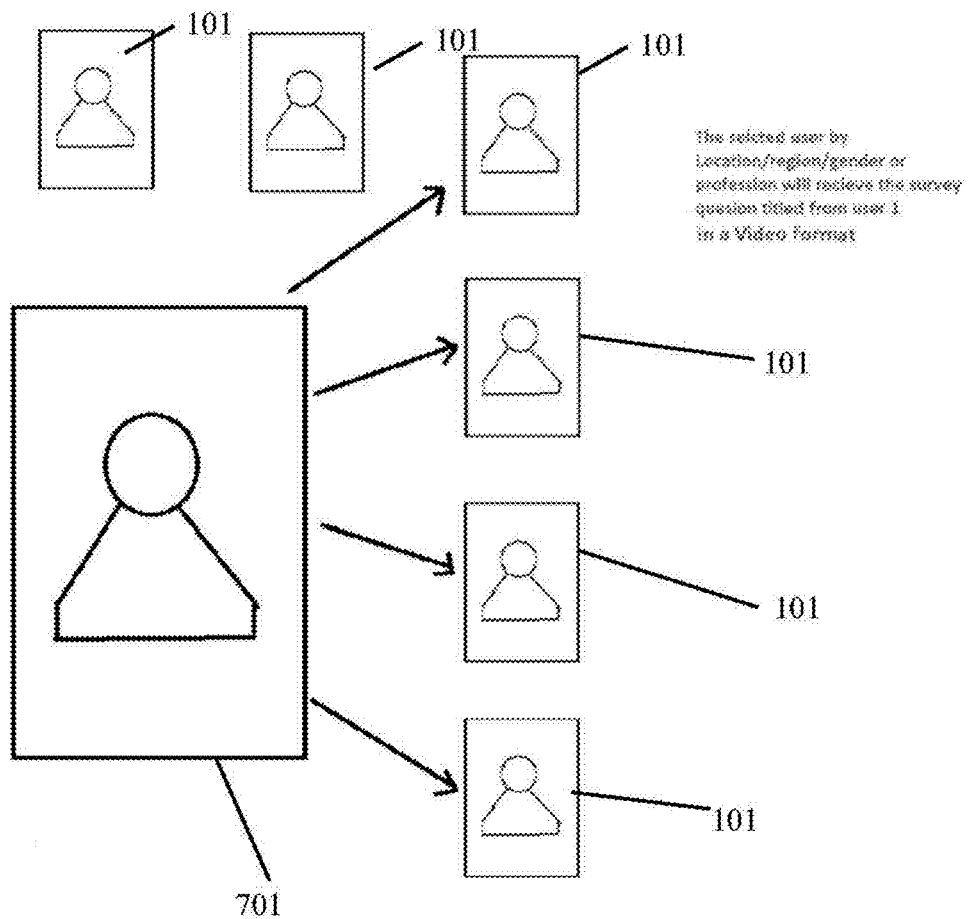
FIGS. 7 is a schematic view showing the presenter presenting subject matter by video to the users of the present invention.

Results of user and follower answers are then compiled 309, generating statistical like information in terms of number of people when responding, number of people from a particular legal regime that responded, number of women that responded, etc. The compiled results 309 are then pushed to the users and followers 311 for their review. As illustrated in FIG. 6, the results of the survey including the user profile are collected in step 601. Then, the results of the survey are compiled and analyzed in step 603. Then, the results are further processed by the user in step 605 to be used by the users to create various user events 607 such as uncover answers, evoke discussions, base decision, and compare results.

Figure 4:
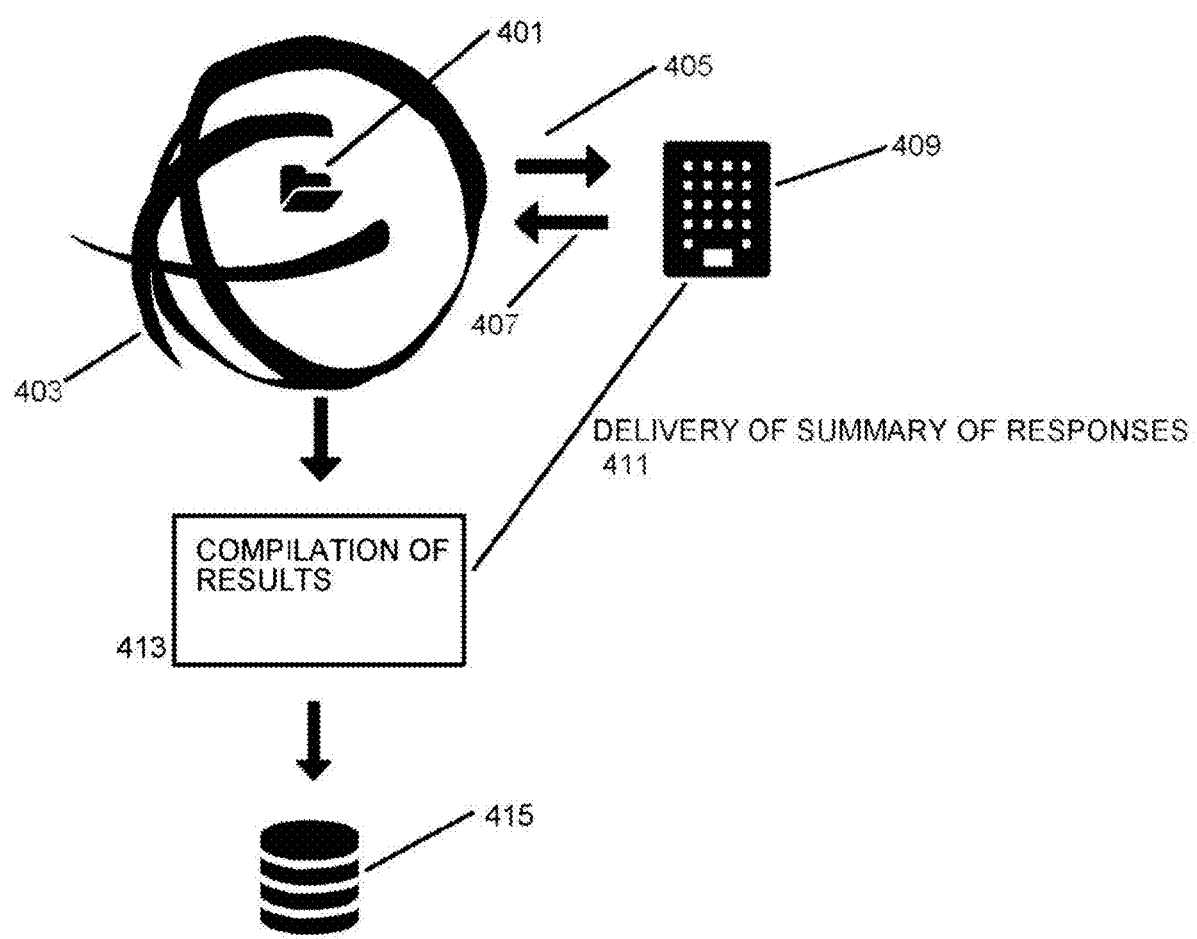
FIG. 4 exhibits the use of a device for accessing the platform of the present invention.

FIG. 4 is an embodiment of the devices used in the present invention, including a platform 401 allowing a user to enter in a new subject matter for worldwide dissemination to other users, whereby the platform 401 operates within a internet-based environment 403. As used herein, the Internet 403 is defined as a global hardware and software infrastructure that comprises public and private computer system that operate according to the Transmission Central Protocol (TCP) and Internet Protocol (IP) communication standards. The Internet is designed to receive, transmit, and route electronic information and data between computer systems and networks located around the world.

Via the Internet 403, the platform 401 is accessible and in communication for sending/pushing 405 and receiving 407 answers and subject matter to devices 409 controlled by users.

The results of answers 411 to subject matter are compiled 413 and stored 415, along with a copy of the subject matter.

Figure 5:
FIG. 5 exhibits the use of GPS satellite technology along with the platform of the present invention.

FIG. 5 is an embodiment of the inventive aspect of the present invention, which is the determination of location data of users and followers who answer pushed subject matter issues. Collection and collation of location data along with responses to subject matter issues gives reviews of the compiled results a worldwide viewpoint or feelings of perception regarding a global issue. As shown in FIG. 5, users 509 located throughout the world can have their location data recorded, for example by global positioning satellite (GPS) 507. In addition, location data can also be collected through WiFi, mobile transceivers, and identifying a current location of the mobile terminal, for example, in a restaurant, based on the collected location data. The platform 503 of the invention, operating within the internet 501, will have communication means 505 in connection with GPS 507 technology.

Figure 8:
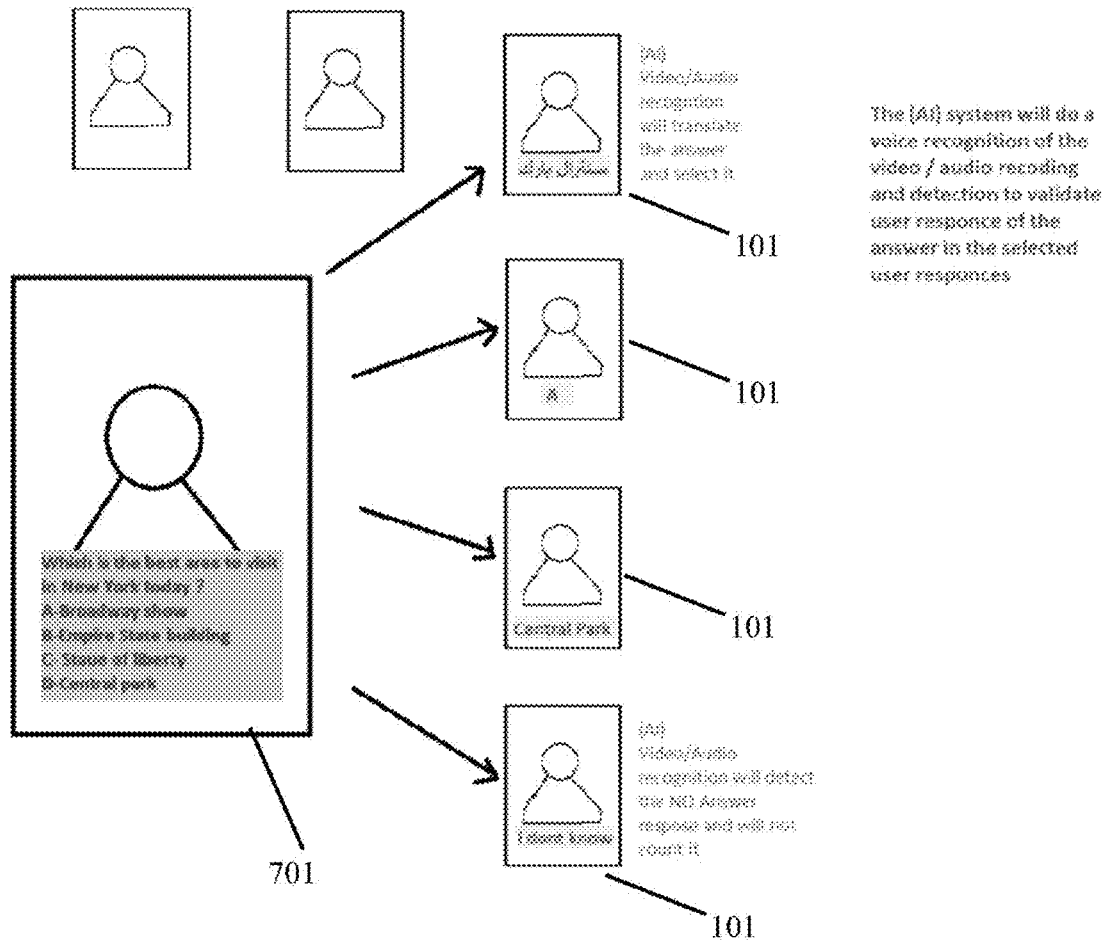
FIG. 8 shows a schematic view showing the users selecting the answer choices of subject matter sent by the presenter of the present invention.

Referring to FIGS. 7-12, the present invention may have the subject matter be presented via video and/or audio and the answers from the users may also be done via video and/or audio. This may be done using cameras, microphones, audio speakers, etc. associated with the user devices. A system 800 is shown in FIG. 11 in which a user may enter a subject matter using a platform 801 (FIG. 11) that allows the user to enter in the new subject matter for worldwide dissemination to other users, whereby the platform 801 operates within an internet-based environment 803. The presenter may turn on his or her camera 808 and record the question and pick the location and users that he wants to answer the question. The present invention may include an Artificial intelligence (AI) system 807 (FIG. 11) that detects the audio from the video and does voice recognition to enable the recognition and translation of spoken language into text. For example, in FIG. 7, the presenter 701 selects the users by one of or any combination of location, region, gender, or profession to receive the survey question titled from the presenter 701 in a video and/or audio format. The presenter may tag keywords to the survey question or they may be automatically added by the AI system and these can be used to select users with a specific interest in one or more of the keywords, having previously interacted with subject matter containing these keywords and thus having them included in their user-specific cookies within the back-end of the platform. The survey may prompt the users to select an answer from several choices of answers as shown in FIG. 8. The platform also allows users to answer by clicking on choices within the application or by video interaction in which they are recorded speaking and making body movements such as nodding their head or using sign language. The AI system can then translate the body movements and sign language to written responses for analysis along with the user responses received by clicking, using the nodal detector as described below.

Figure 12:
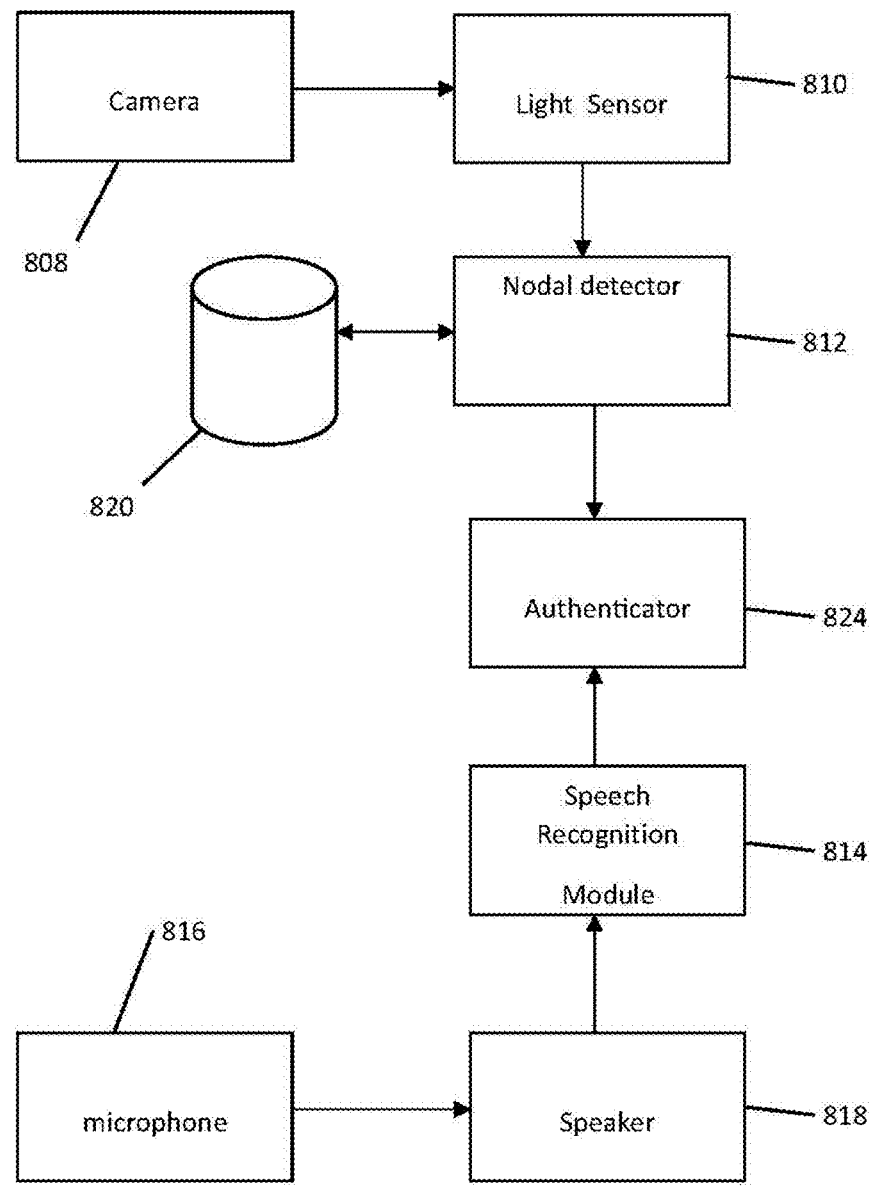
FIG. 12 is a block diagram of components of the AI system of the present invention use to authenticate the user that provided answers.

The AI system 807 may authenticate the users who answer the subject matter by voice via video and audio to make sure that they are not fake by using facial recognition and gesture. As illustrated in FIG. 12, the components involved in this authentication include a camera 808, a light sensor 810, nodal detector 812, speech recognition module 814, microphone 816, audio speaker 818, and authenticator 824. The camera 808 may be a two mexapixel camera. The light sensor 810 may be a RGB light sensor that senses and record the light intensity of the general red, green, and blue spectrums of visible light. The nodal detector 812 utilizes Javasecure(Nodejs) and OpenCV software to detect nodal movements of the face by the spaces between each nodes 813 (FIG. 10) of the face in millimeters first from the camera 808 to the face and then between each node 813, the nodal detector 812 counts the space. Each word and letter has a specific nodal space. So, for example, where you say the word "word", it is different that when you say the word "elephant". The nodal detector 812 can detect up to 1000 nodal points in the face and while the user talks, it detects these nodal movements (gestures) and spaces and searches for a match of the detected nodes and spaces with the same nodes and spaces of words or letters stored in memory 820. These words or letters are to be compared with the voice of the user after elimination of the background noise.

The nodal movements recorded by the nodal detector 812 may also be utilized to enhance the accuracy of the translation of spoken language into text. Specifically, the AI system 807 can detect over 190 languages and the AI system 807 itself detects the words and letters using the nodal detector 812 and stores in memory 820 the words and letters and the particular region/state where the user that spoke those words is located. Since most languages have many accents corresponding to certain regions/states or other locations, the AI system 807 can enhance the accuracy of the translation of spoken language into text for various accents of that language. For example, English has many accents. So, to better understand and record the question/answer accurately within the regional location of the user, the nodal detector 812 compares the nodal movements of the face of the user speaking English during the voicing of the words of the answer or viewpoint in the video with those nodal movements stored in memory 820 corresponding to the certain regions that speak different English accents. The authenticator 824 then determines the English accent that corresponds to the nodal movements stored in memory 820 for a particular region based on the nodal movements detected by the nodal detector 812 to accurately translate the spoken language into text by using the determined accent.

The audible words are spoken by a user through the microphone 816 and outputted by the audio speaker 818 to the speech recognition module 814. The speech recognition module 814 includes recognition algorithm by Javasecure that recognizes the audible words being spoken by the user. The authenticator 824 then compares the words determined by the nodal movements of the nostrils, the lips, and the cheeks tracked by the nodal detector 812 with the words voiced by the user as determined by the speech recognition module 814 to write the text (questions or answer) to determine if the user is fake or not. If the words determined by the nodal movement of the face of the user correlate or correspond with the words voiced by the user as determined by the speech recognition module 814, the authenticator 824 determines that the user is authentic.

The nodal detector can also detect nodal points in the head, hands, arms and other parts of the body in order to read sign language from a user. The components involved include a camera 808, a light sensor 810 and a nodal detector 812. The nodal detector 812 utilizes Javasecure(Nodejs) and OpenCV software to detect nodal movements of the body by the spaces between each nodes 813 (FIG. 10) of the body in millimeters first from the camera 808 to the body and then between each node 813, the nodal detector 812 counts the space. Each word and letter has a specific nodal space. The nodal detector 812 can detect at least 100 nodal points in the body and while the user signs, it detects these nodal movements (gestures) and spaces and searches for a match of the detected nodes and spaces with the same nodes and spaces of words or letters stored in memory 820. The words are then recorded by the AI system as text to be used for analysis and translation.

In the same way, the nodal detector can also detect nodal points in the head, hands, arms and other parts of the body in order to read simple responses of non-verbal communication from a user such as "yes" or "no". Each simple response has one or more specific nodal spaces which represent gestures such as nodding the head to communicate "yes", or shaking the head from side to side to communicate "no". The nodal detector 812 can detect 100 nodal points in the body and while the user signs, it detects these nodal movements (gestures) and spaces and searches for a match of the detected nodes and spaces with the same nodes and spaces simple responses of non-verbal communication stored in memory 820. The simple responses are then recorded by the AI system as text to be used for analysis and translation.

Figure 13:
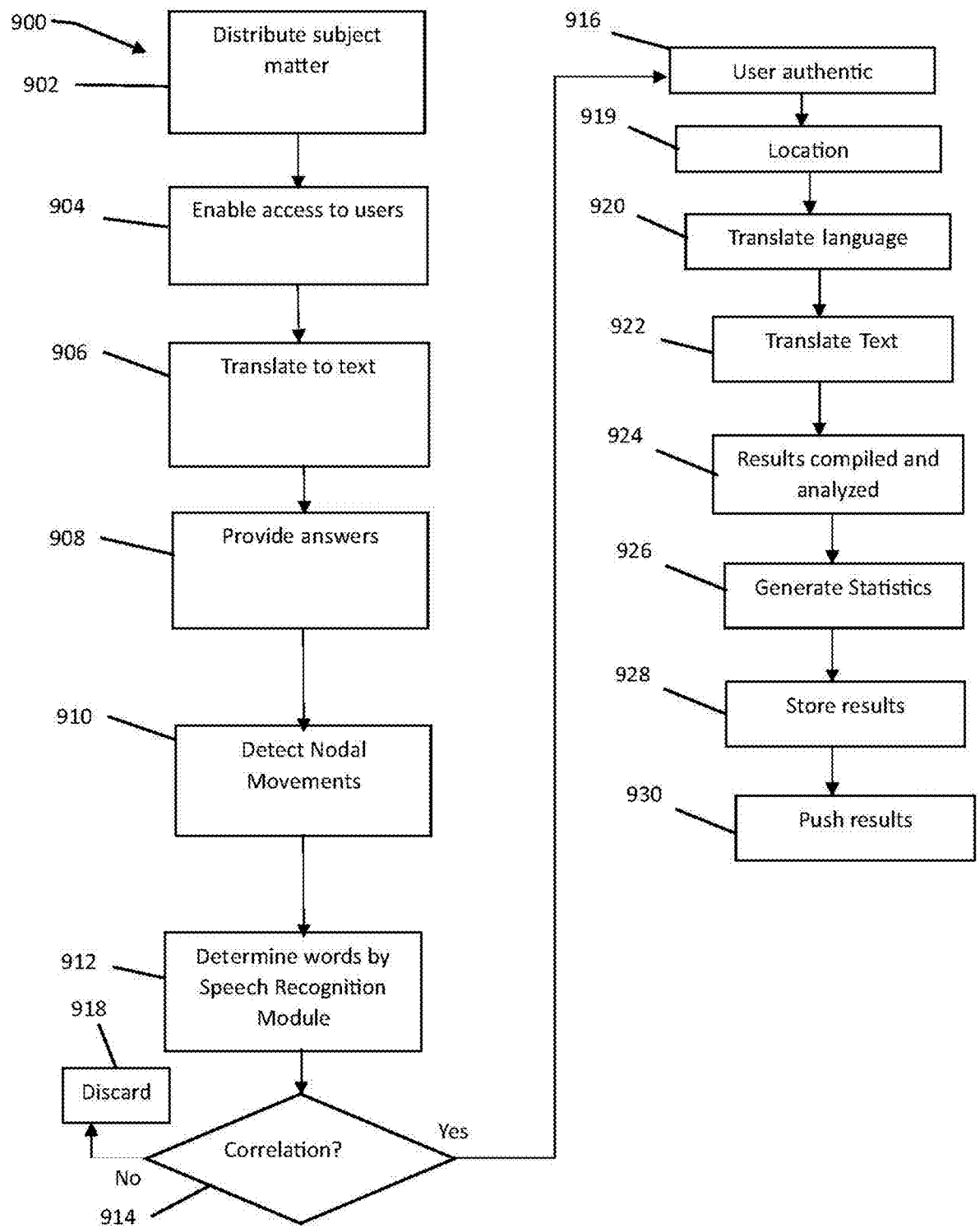
FIG. 13 is a flow diagram of a method for collecting, collating, and distributing worldwide viewpoints of particular issues to the multiple users using the AI system of the present invention.
Figure 14:
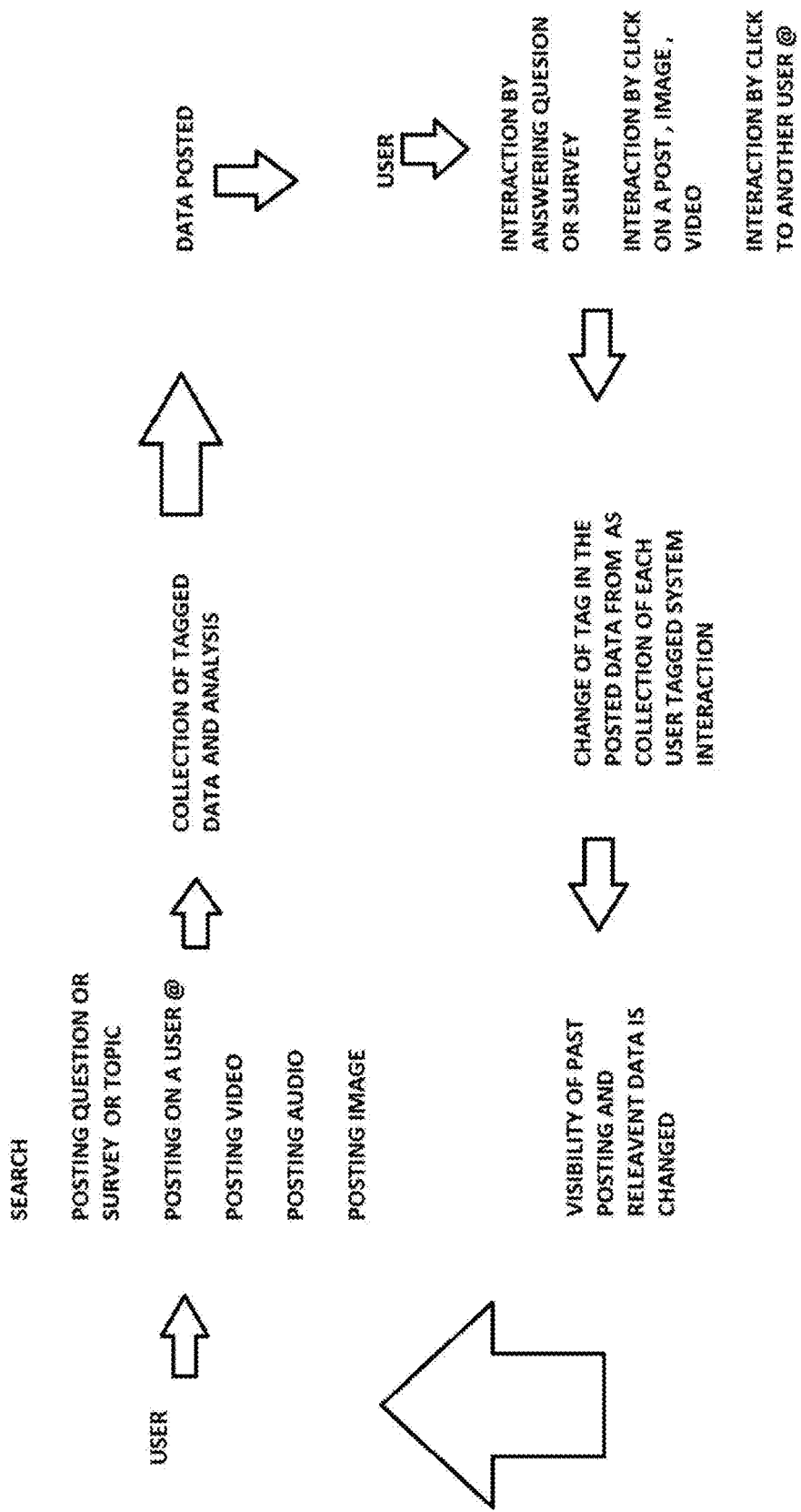
FIG. 14 is a flow diagram of a method of the present invention.
Figure 15:
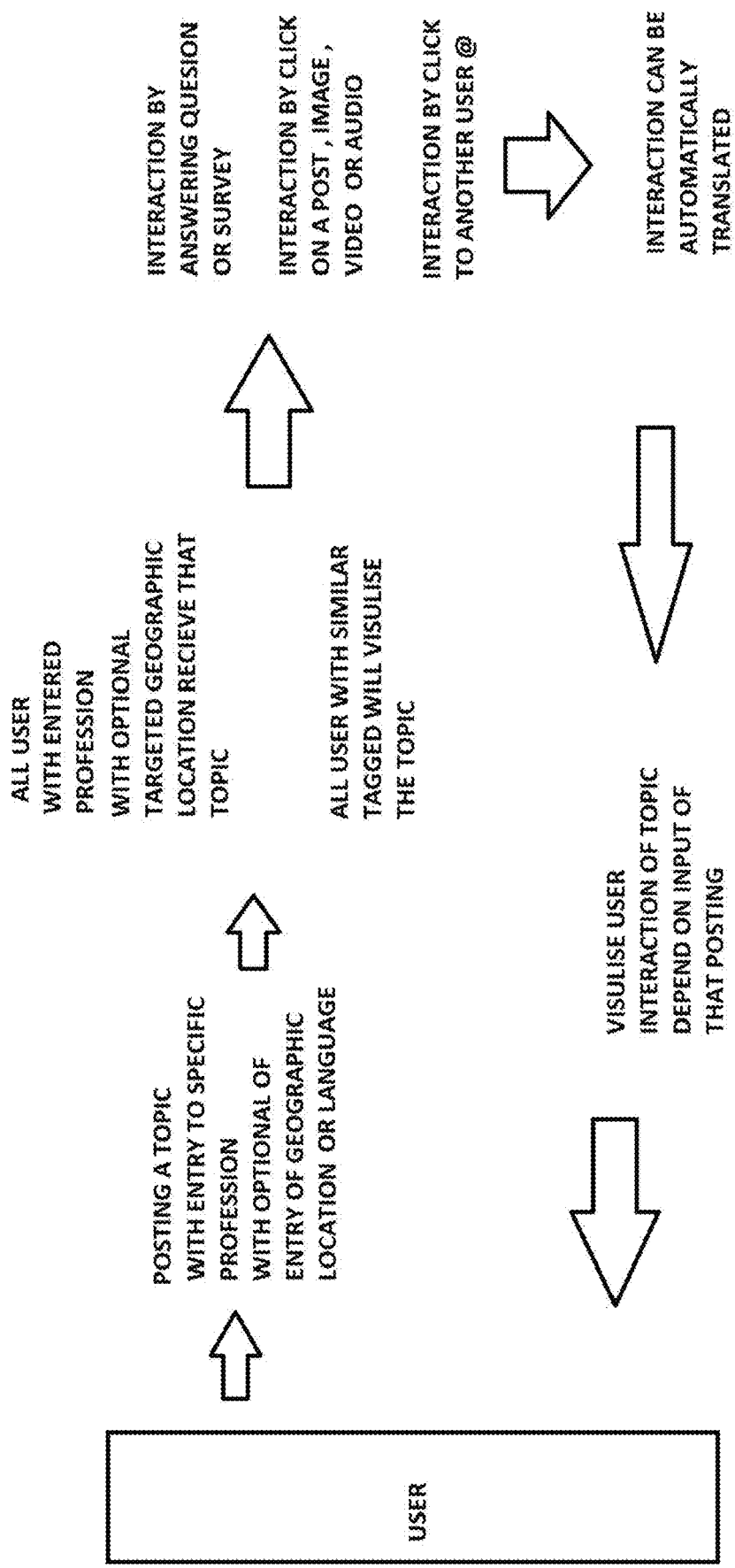
FIG. 15 is a flow diagram of a method of the present invention.
Figure 16:
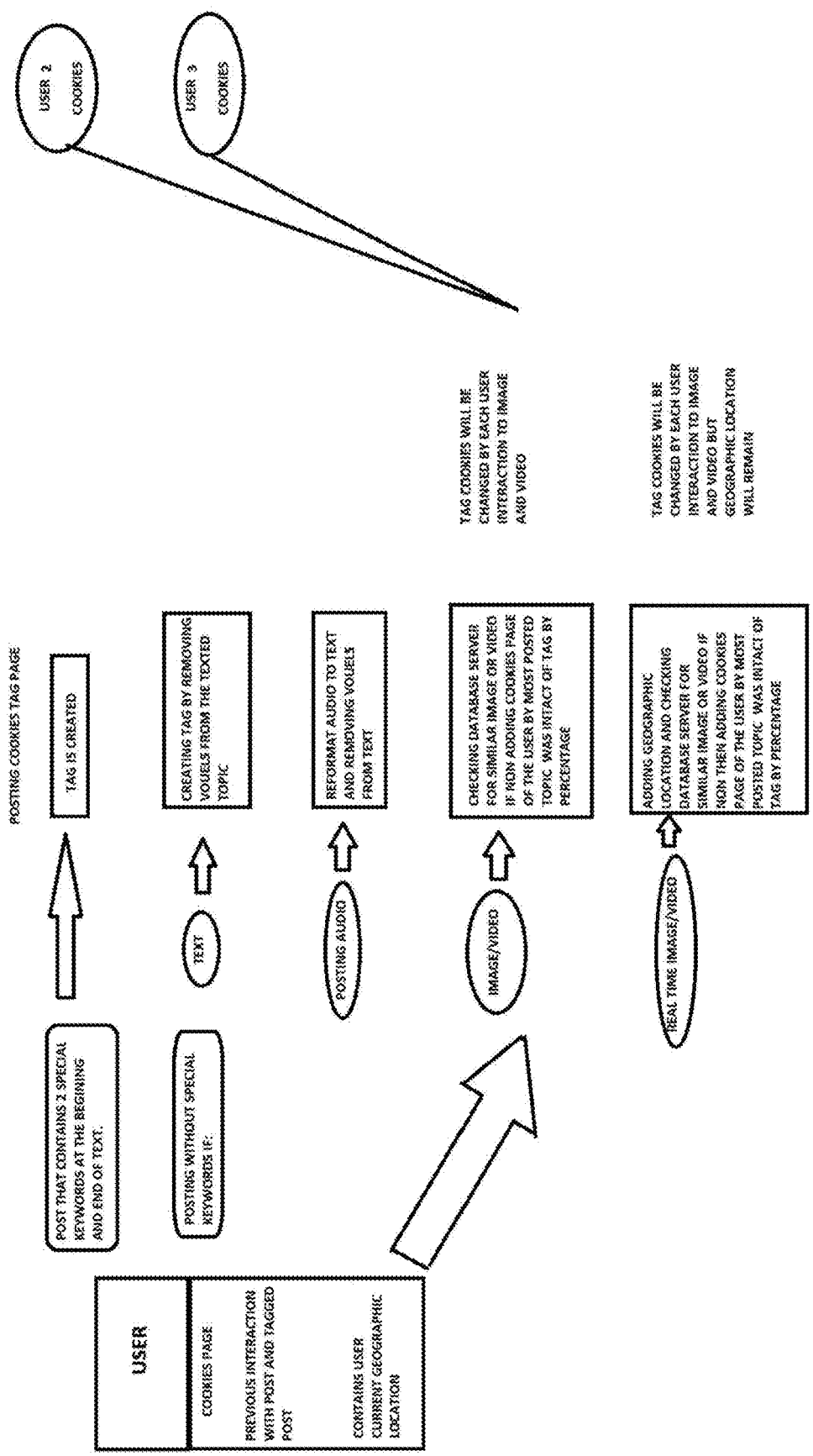
FIG. 16 is a flow diagram of a method of the present invention.
Figure 17:
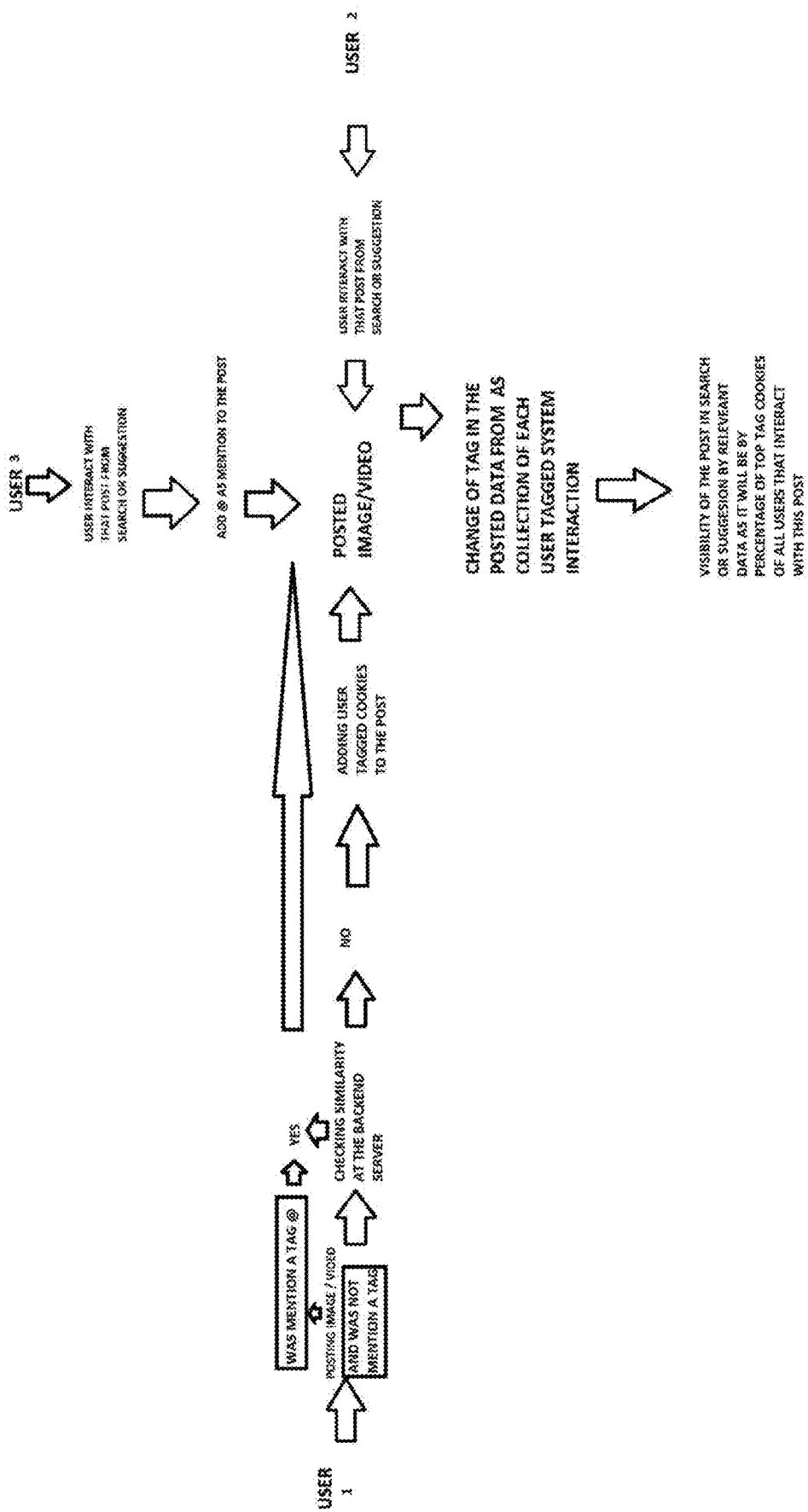
FIG. 17 is a flow diagram of a method of the present invention.

With reference now to FIG. 13, an example methodology 900 for collecting, collating, and distributing worldwide viewpoints of particular issues to the multiple users who are interested in the particular issues is illustrated and described. While the methodology is described as being a series of acts or steps that are performed in a sequence, it is to be understood that the methodology is not limited by the order of the sequence. For instance, some acts or steps may occur in a different order than what is described herein. In addition, a step may occur concurrently with another step. Furthermore, in some instances, not all steps may be required to implement a methodology described herein.

Moreover, the steps or acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodology may be stored in a computer-readable medium, displayed on the display device, and/or the like.

In step 902 a presenter distributes from an internet based platform 801 subject matter relating to the particular issues to user devices of the multiple users. In step 904, the users are enabled to gain access to the subject matter through their user devices. The presenter 701 may select the users by one of or any combination of location, region, gender or profession to receive the survey question titled from the presenter 701 in a video and/or audio format. The presenter then sends the video/audio recording of the survey question to the users.

After the presenter 701 selects the users by one of or any combination of location, region, gender or profession to receive the survey question titled from the presenter 701 in a video and/or audio format and sends the video/audio recording of the survey question to the users, the AI system 807 may performs a voice recognition process of the video/audio recording to translate the spoken language into text in step 906. Alternatively, the users may just receive video/audio recording and view and listen to it.

The survey or subject may provide the users with choices for the user to select the answer or have the user provide their own answer or viewpoints as illustrated in FIG. 8. The users then provide their voiced answers or viewpoints on the subject matter by video as well as user data through the user devices in step 908. Alternatively, the users can provide answer by text or select on his or her user device one of the answer choices provided to them by the presenter.

The AI system 807 also authenticates the user to make sure that the user is not fake. As previously mentioned, the AI system 807 may authenticate the users to make sure that they are not fake by using facial recognition and gesture. Specifically, for answers that are voiced and sent by video, the two megapixel camera 808 records the user voicing the answer. The video recorded by the camera 808 is sent to the nodal detector 812 and light sensor 810. The nodal detector 812 in combination with the light sensor 810 detects the nodal movements of the user's face to determine the words said by the user during the voice of the answer or viewpoint of the user in step 910. In step 912, the words voiced in the video of the viewpoint or answer provided by each of the one or more multiple user is determined using the speech recognition module 814. The authenticator 824 of the AI system then compares the words determined by the nodal movements of the user's face tracked by the nodal detector 812 with the words voiced by the user as determined by the speech recognition module to write the text (questions or answer) to determine if the user is fake or not in step 914. If the words determined by the nodal movement of the face of the user correlates or corresponds with the words voiced by the user as determined by the speech recognition module, the authenticator 824 determines that the user is authentic in step 916. If the authenticator 824 determines that the user is fake or that the user's face is not present or a picture is put in front of the camera so that voice nodal movements and gestures are not present, then the AI system discards the answers from the statistical compilation of the results in step 918. The locations of the user devices of the multiple users who answered the distributed subject matter are also determined using signals from the location devices such as the global positioning satellite (GPS) 507 in step 919.

Figure 10:
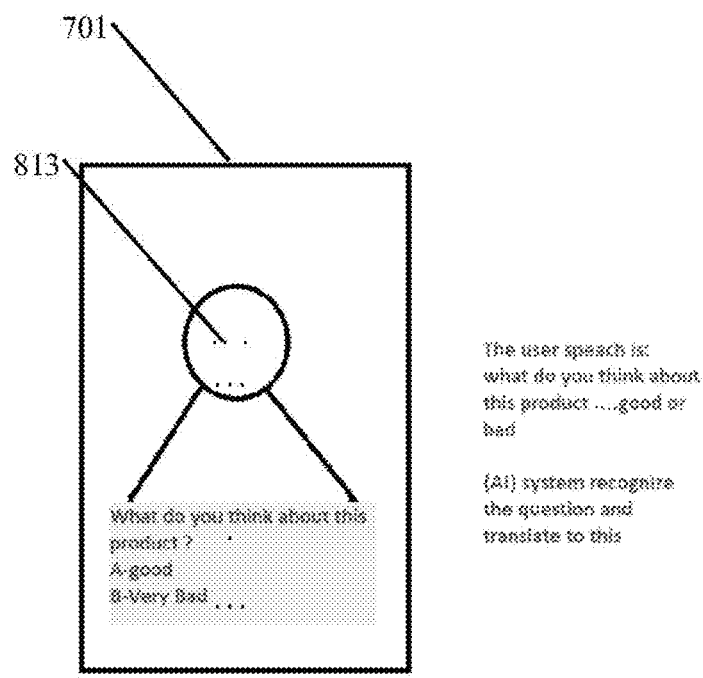
FIG. 10 shows a schematic view of an example of the user's speech being translated to text in the formation of a question with itemized answer choices of the present invention.

If the spoken language is a foreign language or is otherwise desired, the AI system 807 can translate the foreign language into the language that the presenter is using or a language different from the presenter such as a language of another user that also receives the answer in step 920. Also, in step 920, the words voiced by user of the answer may be translated into a language that is different from that spoken by the user using the accent determined by the nodal movements of the face of the user during the voicing of the words of the answer or viewpoint in the video as previously mentioned. Then, the AI system 807 translates the spoken words to text in step 922. The translated text may be in a particular format. For example, FIG. 10 shows an example of the user's speech being translated to text in the formation of a question with itemized answer choices to be selected by another user. The text of the answer may be displayed on the display 822 of the user device 805 of the presenter as well as on a display of the user device 805 of the user voicing that answer. If a user does not select an answer or provide an answer, the AI system 807 does not count it as an answer.

Figure 9:
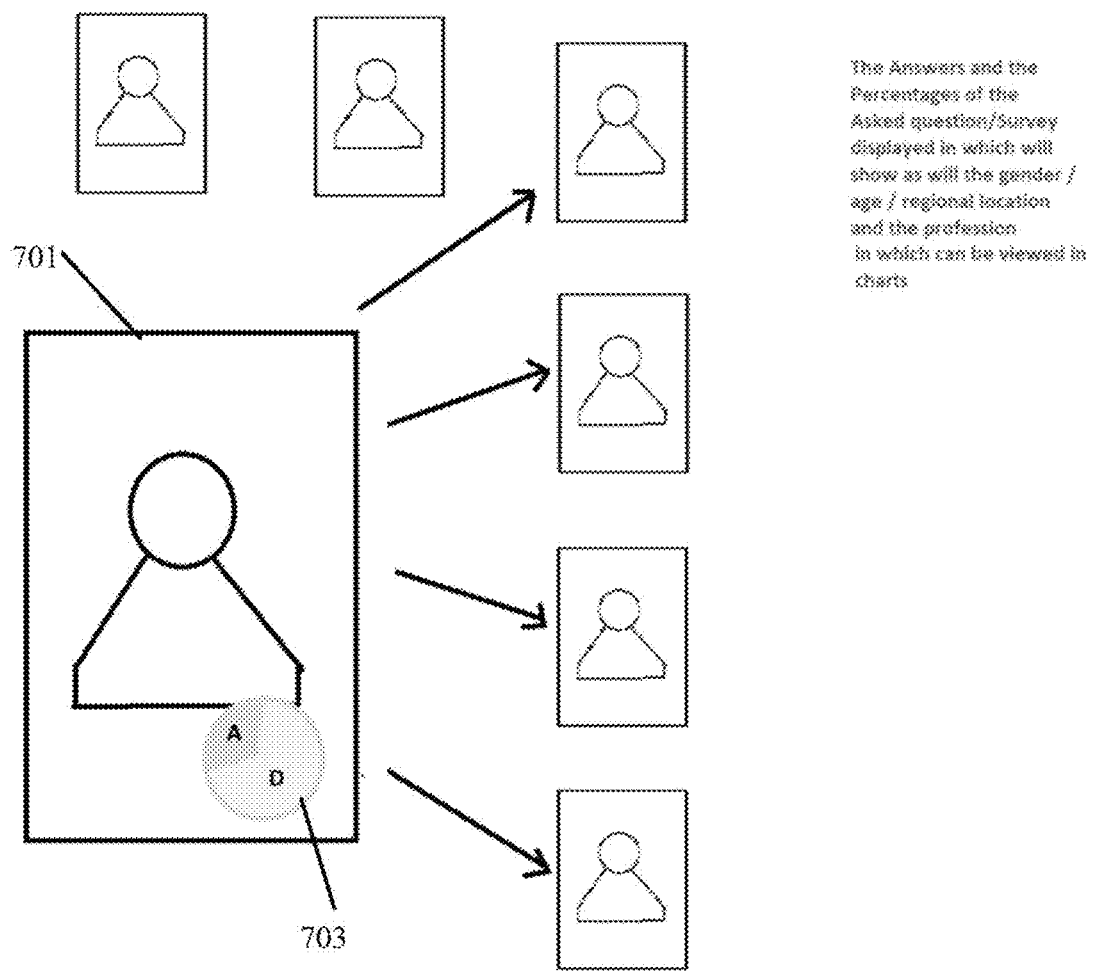
FIG. 9 shows a schematic view of the presenter and users of the present invention generating a chart from the results of the survey of the answers to the subject matter.

The results of the viewpoints and user data of the multiple users who are determined to be authentic and answered the subject matter issues are then compiled 309 and analyzed in step 924. Then in step 926, based on the results of the compilation and analysis, statistical like information in terms of number of people when responding, number of people from a particular legal regime that responded, number of women that responded, etc. is generated. As illustrated in FIG. 9, the statistical like information can be in the form of a chart 703. For example, the percentage and chart of the answers from that question as viewpoint or voting may be shown by a chart. The subject matter and the results compilation and analysis are stored by a remote storage in step 928. The compiled results 309 are then pushed to the users and followers 311 and displayed for their review in step 930. The AI system 807 may determine the language first and then count the answer. Unwanted answers will be discarded after counting at the end of a time limit.

In essence, the presenter opens his camera and records and asks the question and picks the location and users that he wants to answer the question. Users see this question and responds to the question. The users can respond by opening their camera and record the video of their answer. The AI system detects fake users and discards the unwanted results. All users who asked and answered get the results of the answers by percentage or in a chart.

What is claimed is:

1. A computer implemented method comprising:
   distributing from an internet-based platform, subject matter relating to the particular issues to user devices of the multiple users;
   tagging one or more keywords to the subject matter;
   enabling the multiple users to gain access to the subject matter through the user devices;
   using signals from a location device to determine a user's location, wherein the location device is one of or any combination of a global positioning satellite, a WiFi, a mobile transceiver, and a mobile terminal;
   tracking the interests of individual users in cookies within the user data on the back-end of the platform, by adding the keywords to the cookies of the user of subject matter created by the user and any other subject matter the user interacts with;
   enabling users to search for other users with particular interests stored in their cookies files and target subject matter towards these particular users;
   presenting subject matter to a user, prioritized according to the user's interests as stored as keywords in the user's cookies;
   providing viewpoints on the subject matter issues by one or more of the multiple users as well as user data through the user devices, wherein the viewpoints of one or more of the multiple users are provided by a video of each of the one or more of the multiple users;
   detecting, using a nodal detector, the nodal movements of the face and body of the user during the voicing, signing or non-verbal communication of the response in the video of the viewpoint provided by each of the one or more multiple users;
   determining the words voiced, signed or non-verbally communicated in the response in the video of the viewpoint provided by each of the one or more multiple users based on the detected nodal movements of the face and body of the user during the response in the video of the viewpoint;
   determining, using a speech recognition module, the words voiced in the video of the viewpoint provided by each of the one or more multiple users;
   comparing the words determined by the nodal movements of the face of the user with the words voiced by the user as determined by the speech recognition module.

2. The method of claim 1, further comprising tagging one or more keywords to the subject matter using an AI system which automatically creates keywords from the subject matter.

3. The method of claim 2, further comprising creating keywords from the subject matter, whereby the subject matter consists of text, by analyzing and selecting keywords from the text of the subject matter.

4. The method of claim 2, further comprising creating keywords from the subject matter, whereby the subject matter consists of an audio or video file, by using the speech recognition module to extract the words voiced in the file as text, and by analyzing and selecting keywords from the text.

5. The method of claim 2, further comprising creating keywords from the subject matter, whereby the subject matter consists of a video file, by using the nodal detector to detect the nodal movements of the face and body of the user during voicing or signing in the video, and determining the words from the nodal movements of the face and body of the user during voicing or signing in the video, and extracting the words as text, and by analyzing and selecting keywords from the text.

6. The method of claim 2, further comprising creating keywords from the subject matter, whereby the subject matter consists of an image or video file, by searching the platform's internal database for similar images or videos and selecting the keywords associated with those similar images or videos.

7. The method of claim 2, further comprising creating keywords from the subject matter, whereby the subject matter consists of an image or video file, by adding the keywords stored in cookies of the file's creator to the file and then adding to the file the keywords stored in cookies of each successive user that views the file, and then tagging to the subject matter the most common keywords that have been added to the file.

8. The method of claim 2, further comprising creating keywords from the subject matter, whereby the subject matter is a live capture audio, image or video file, by extracting the location of the user during the live capture of the file, and selecting from the location, one or more keywords representing the location of the live capture.

9. The method of claim 1 further comprising tagging multiple keywords together into a phrase, wherein the phrase having spaces between the keywords, and enabling the user to place a special character at the beginning and end of the phrase to indicate within the computer implemented method the beginning and end of the phrase to be treated as a single keyword.

10. The method of claim 1, further comprising translating automatically to all languages, any text on the platform including posts and surveys as well as keywords, so that the text on the platform is always displayed in the preferred language of a user.

11. The method of claim 1, further comprising removing vowels from keywords when they are stored to cookies to reduce memory storage demand.

12. A system comprising:
an internet-based platform, wherein the internet-based platform is configured to enable a presenter to enter a subject matter of the particular issues for worldwide dissemination, wherein the internet-based platform is further configured to enable platform users to send and receive via videos of answers voiced from the platform users on the subject matter and user data, wherein the internet-based platform is further configured to enable the subject matter to be tagged with one or more keywords to identify the topic or topics it addresses;
user devices controlled by platform users that can access the internet-based platform via an internet-based environment;
a location device, wherein the location device is in operative connection with the internet-based platform, wherein the location of a user device is determined using signals from the location device, wherein the location device is one of or any combination of a global position satellite, a WiFi, a mobile transceiver, and a mobile terminal;
a nodal detector, wherein the nodal detector is operative to detect the nodal movements of the face and body of one or more of the users during the voicing, signing or non-verbal communication of the words in the video of the answer on the subject matter and determine the words voiced, signed or non-verbal communicated in the video of the answer based on the detected nodal movements of the face and body of the user during the voicing, signing or non-verbal communication of the words in the video of the answer;
a speech recognition module, wherein the speech recognition module is operative to determine the words voiced in the video of the viewpoint provided by each of the one or more multiple users;
a keyword cookies module, wherein the keyword cookies module is operative to record the interests of an individual user of the platform by storing keywords from the user's searches and subject matter that the user interacts with on the platform, in cookies files within the back-end of the platform.

13. The system of claim 12, wherein an artificial intelligence (AI) module is operative to automatically create keywords for subject matter posted to the platform.

14. The system of claim 13, wherein the subject matter consists of text, and the AI module analyzes and selects keywords from said text to tag to the subject matter.

15. The system of claim 13, wherein the subject matter consists of an audio or video file, and the AI module automatically uses the speech recognition module to extract the words voiced in the file as text, and the AI module analyzes and selects keywords from said text to tag to the subject matter.

16. The system of claim 13, wherein the subject matter consists of a video file, and the AI module automatically uses the nodal detector to detect the nodal movements of the face and body of the user during voicing or signing in the video to determine the words from the nodal movements of the face and body of the user during voicing or signing in the video, and extracts the words as text, and the AI module analyzes and selects keywords from said text to tag to the subject matter.

17. The system of claim 13, wherein the subject matter consists of an image or video file, and the AI module automatically searches the platform's internal database for similar images of videos and selects the keywords associated with those similar images and videos and tags them to the subject matter.

18. The system of claim 13, wherein the subject matter consists of an image or video file, and the AI module automatically adds the keywords stored in cookies of the file's creator to the file and then adds to the file the keywords stored in cookies of each successive user that views the file, and then the AI module finds the most common keywords added to the file and tags those keywords to the file.

19. The system of claim 13, wherein the subject matter consists of a live action image or video file, and the AI module automatically extracts the location of the user during the live capture of the file and selects from the location, one or more keywords representing the location of the live capture.

20. The system of claim 12, wherein the keyword cookies module automatically removes vowels from keywords when they are stored in cookies, to reduce memory storage demand.

* * * * *